(12) United States Patent
Lee

(10) Patent No.: US 8,065,693 B2
(45) Date of Patent: Nov. 22, 2011

(54) CLAMPING DEVICE WITH WEIGHTED STOPPER FOR SPINDLE MOTOR

(75) Inventor: Tae Wook Lee, Namdong-gu (KR)

(73) Assignee: LG Innotek Co., Ltd., Seoul (KR)

( * ) Notice: Subject to any disclaimer, the term of this patent is extended or adjusted under 35 U.S.C. 154(b) by 831 days.

(21) Appl. No.: 11/957,231

(22) Filed: Dec. 14, 2007

(65) Prior Publication Data

US 2008/0225434 A1 Sep. 18, 2008

(30) Foreign Application Priority Data

Mar. 15, 2007 (KR) .................. 10-2007-0025510

(51) Int. Cl.
*G11B 17/028* (2006.01)
(52) U.S. Cl. ....................................... 720/707
(58) Field of Classification Search ............ 720/707, 720/715, 695, 704, 706
See application file for complete search history.

(56) References Cited

U.S. PATENT DOCUMENTS

| | | | | |
|---|---|---|---|---|
| 4,562,570 A | * | 12/1985 | Denton | 720/709 |
| 5,710,678 A | * | 1/1998 | Leuthold et al. | 360/99.08 |
| 5,761,186 A | * | 6/1998 | Mushika et al. | 720/704 |
| 6,208,613 B1 | * | 3/2001 | Iizuka | 720/707 |
| 6,711,117 B1 | * | 3/2004 | Kanbe | 720/701 |
| 6,907,611 B2 | * | 6/2005 | Konno et al. | 720/604 |
| 6,961,949 B2 | * | 11/2005 | Horng et al. | 720/695 |
| 7,254,822 B2 | * | 8/2007 | Chiu | 720/707 |
| 7,877,764 B2 | | 1/2011 | Takaki et al. | |
| 7,890,970 B2 | | 2/2011 | Iwai et al. | |
| 2002/0085481 A1 | | 7/2002 | Kim et al. | |
| 2005/0229192 A1 | | 10/2005 | Jung et al. | |
| 2006/0085809 A1 | | 4/2006 | Iwai | |
| 2007/0284972 A1 | * | 12/2007 | Kim | 310/67 R |

FOREIGN PATENT DOCUMENTS

| | | | |
|---|---|---|---|
| DE | 3204987 | * | 8/1983 |
| JP | 2003-203410 A | | 7/2003 |
| JP | 2006-092668 A | | 4/2006 |
| JP | 2006-147132 A | | 6/2006 |
| KR | 20-1999-0020400 U | | 6/1999 |
| KR | 10-2002-0049066 A | | 6/2002 |
| KR | 10-2003-0024355 A | | 3/2003 |
| KR | 10-2003-0057301 A | | 4/2003 |
| KR | 2004-013568 A | * | 2/2004 |
| KR | 10-2005-0078814 A | | 8/2005 |
| KR | 10-2005-0096388 A | | 10/2005 |

* cited by examiner

*Primary Examiner* — Julie Anne Watko
(74) *Attorney, Agent, or Firm* — Saliwanchik, Lloyd & Eisenschenk

(57) ABSTRACT

Provided is a clamping device of a spindle motor including a body, a stopper, a weight, and an elastic member. The stopper is coupled to the body. The weight is coupled to the stopper. The elastic member elastically supports the stopper. According to one embodiment, at least a portion of each stopper is coated with a material having a specific gravity higher than the specific gravity of the body. This material provides the weight coupled to the stopper.

4 Claims, 2 Drawing Sheets

CLAMPING DEVICE WITH WEIGHTED STOPPER FOR SPINDLE MOTOR

CROSS-REFERENCE TO RELATED APPLICATION

The present application claims the benefit under 35 U.S.C. §119 of Korean Patent Application No. 10-2007-0025510, filed Mar. 15, 2007, which is hereby incorporated by reference in its entirety.

BACKGROUND

A spindle motor rotates a disk for an optical pick-up device to read data stored on the disk or write data on the disk.

A clamping device coupled to the spindle motor supports the disk at a desired position and rotates the disk according to the rotation of the spindle motor.

BRIEF SUMMARY

Embodiments of the present invention provide a clamping device of a spindle motor.

Certain embodiments of the present invention also provide a clamping device of a spindle motor, which can support a disk firmly.

In one embodiment, a clamping device of a spindle motor includes a body, a stopper coupled to the body, a weight coupled to the stopper, and an elastic member elastically supporting the stopper.

In another embodiment, a clamping device of a spindle motor includes a body, a stopper coupled to the body, where the stopper includes a material having a specific gravity higher than that of the body, and an elastic member elastically supporting the stopper.

In yet another embodiment, a clamping device of a spindle motor includes a rotatable body supported by a rotation shaft, a plurality of stoppers coupled to the body at the same distance from a center of the rotation shaft, the stoppers supporting a disk and including a material having a specific gravity in a range from 1 to 30; and a plurality of elastic members elastically supporting the stoppers, respectively.

The details of one or more embodiments are set forth in the accompanying drawings and the description below. Other features will be apparent from the description and drawings, and from the claims.

DETAILED DESCRIPTION

Reference will now be made in detail to embodiments of the present disclosure, examples of which are illustrated in the accompanying drawings.

Figure 1:
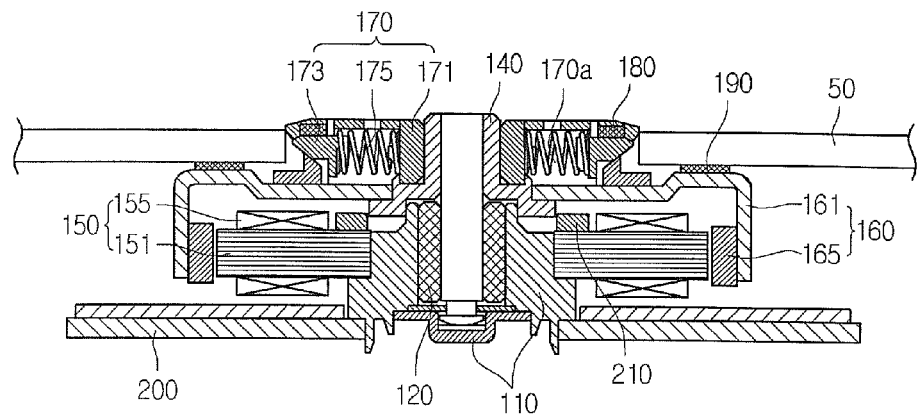
FIG. 1 is a cross-sectional view illustrating a spindle motor according to an embodiment of the present invention.

FIG. 1 is a cross-sectional view illustrating a spindle motor according to an embodiment.

Referring to FIG. 1, a bearing housing 110 having a cylindrical shape can be disposed on a base 200. A bearing 120 can be press fitted along an inner circumference of the bearing housing 110. A lower portion of a rotation shaft 130 is rotatably supported by the bearing 120. A bush 140 can be fixed on an outer circumference of the rotation shaft 130 that is exposed above an upper portion of the bearing housing 110.

A stator 150 can be fixed on an outer circumference of the bearing housing 110, and a rotor 160 can be fixed on the bush 140. The stator 150 includes a core 151 fixed to the bearing housing 110 and a coil 155 wound around the core 151.

The rotor 160 can be fixed to the bush 140 along a central inner portion of the rotor 160. An edge portion of the rotor 160 includes a rotor yoke 161 and a magnet 165. The rotor yoke 161 surrounds the stator 150. The magnet 165 is fixed on an inner circumference of the rotor yoke 161 and faces the stator 150.

Although the rotor yoke 161 is coupled to the bush 140 in the embodiment illustrated in FIG. 1, the rotor yoke 161 may be coupled to the rotating shaft 130 directly.

When current is applied to the coil 155, the rotor 160 is rotated by an electric field generated by the coil 155 and a magnetic field generated by the magnet 165, thereby rotating the bush 140 and the rotation shaft 130. In a further embodiment, the spindle motor can include an attraction magnet 210 on the core.

A disk 50 can be mounted on a top surface of the rotor yoke 161. A friction member 190 for inhibiting sliding of the disk 50 is interposed between the rotor yoke 161 and the disk 50. The friction member 190 may be formed of felt.

A clamping device 170, which can be provided to support the disk 50 mounted on the rotor yoke 161, can be coupled to the bush 140. Although the clamping device 170 may be fixed to the bush 140 in the embodiment illustrated in FIG. 1, in another embodiment, the clamping device 170 may be fixed to the rotation shaft 130 directly.

The clamping device 170 includes a body 171, stoppers 173, and elastic members 175.

The body 171 can have a disk shape. A center portion of the body 171 is fixed to the bush 140. An inner circumference of the disk 50 can be fitted on an outer circumference of the body 171.

Each stopper 173 is disposed in a space 171a radially formed from the center of the body 171 in the outer circumference of the body 171. One end portion of the stopper 173 is disposed in an outer portion of the body 171, and the other end portion is disposed in an inner portion of the body 171.

Each elastic member 175 disposed in the inner portion of the body 171 elastically supports the stopper 173 toward the outer portion of the body 171. The elastic member 175 may be a spring.

A plurality of claws (not shown) may be further provided, which can be used to align the center of the disk 50 with that of the rotation shaft 130.

The stopper 173 can be disposed to rotate and reciprocate straightly between the outer portion and the inner portion of the body 171. When the disk 50 disposed on a top surface of the body 171 is pushed down, a lower edge adjacent to the inner circumference of the disk 50 pushes a top surface disposed on an end portion of the stopper 173 such that the end portion of the stopper rotates downward and moves toward the center portion of the body 171.

Thereafter, when the disk 50 is pushed further down to be mounted on the rotor yoke 161, the stopper 173 is returned to the original position by the elastic member 175. An outer surface of the end portion of the stopper 173 inclines toward the center portion of the body 171 as it goes downward. Thus, an upper edge of the end portion of the stopper 173 catches the inner circumference of the disk 50, and the disk 50 is not released from the body 171.

According to embodiments of the present invention that incorporate claws, the claws (not shown in FIG. 1) can be spaced a predetermined distance with one another along the outer circumference of the body 171. Each claw can be disposed between adjacent stoppers 173 (such as shown in the embodiment illustrated in FIG. 2). When the disk 50 is fitted on the outer circumference of the body 171 to be mounted on the rotor yoke 161, the claws contact the inner circumference of the disk 50 to align the center of the disk 50 with that of the rotation shaft 130.

In the clamping device 170 of the spindle motor according to an embodiment of the present invention, when the spindle motor is stopped, the disk 50 can be easily mounted on the top surface of the rotor yoke 161 and released from the rotor yoke 161.

In addition, in the clamping device 170 of the spindle motor according to an embodiment, when the spindle motor is driven to rotate the disk 50, a centrifugal force exerted on the disk is increased, thereby inhibiting the release of the disk 50 from the body 171 due to impact.

In a further embodiment, a weight 180 can be formed in each stopper 173. When the clamping device 170 is rotated by the rotation of the rotation shaft 130, the centrifugal force exerted on the stopper 173 increases according to the mass of the weight 180, thereby supporting the disk 50 firmly.

For example, when the weight 180 having a mass of 0.5 g is spaced 6 mm from the center of the rotation shaft 130 and is rotated at 5000 rpm, the centrifugal force exerted on the weight 180 is about 83.9 g force.

That is, when the spindle motor is stopped or not rotating, the disk 50 can be easily mounted or released. However, when the spindle motor is driven to rotate, the centrifugal force generated by the rotation of the spindle motor and increased by the weight 180 firmly supports the disk 50.

According to embodiments of the present invention, a specific gravity of the weight 180 is higher than that of the stopper 173.

When the stopper 173 has a specific gravity ranging from 0.5 to 0.9, the weight 180 may have a specific gravity ranging from 1 to 30.

The weight 180 can be formed of, for example, tungsten having a specific gravity of 19.26 or copper having a specific gravity of 9.96. Furthermore, the weight 180 can include materials such as ceramic, silver, aluminum, cobalt, cerium, chrome, gallium, germanium, nickel, and titanium.

In addition, the center of gravity of the weight 180 may be higher than that of the disk 50 mounted on the rotor yoke 161. Thus, the stopper 173 is capable of pushing down the disk such that the disk 50 is supported more firmly.

The weight 180 may have a shape such as sphere, cylinder, or prism, and may be formed of non-metal or metal having a high specific gravity.

In certain embodiments, the weight 180 can be provided toward an end portion of the stopper 173 without being exposed from the end portion of the stopper 173.

The stopper 173 and the weight 180 can be separately manufactured and then coupled with each other. Alternatively, the stopper 173 and the weight 180 can be integrally formed with each other using, for example, injection molding.

Figure 2:
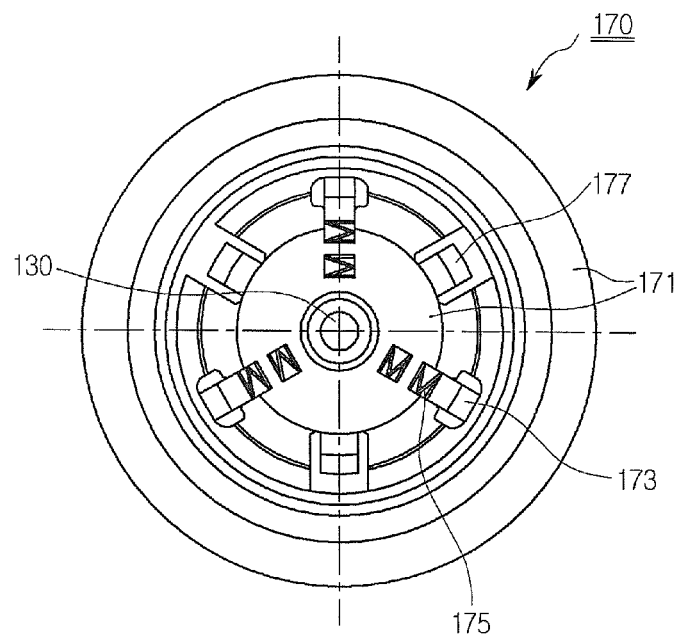
FIGS. 2 and 3 are views illustrating a clamping device according to an embodiment of the present invention.
Figure 3:
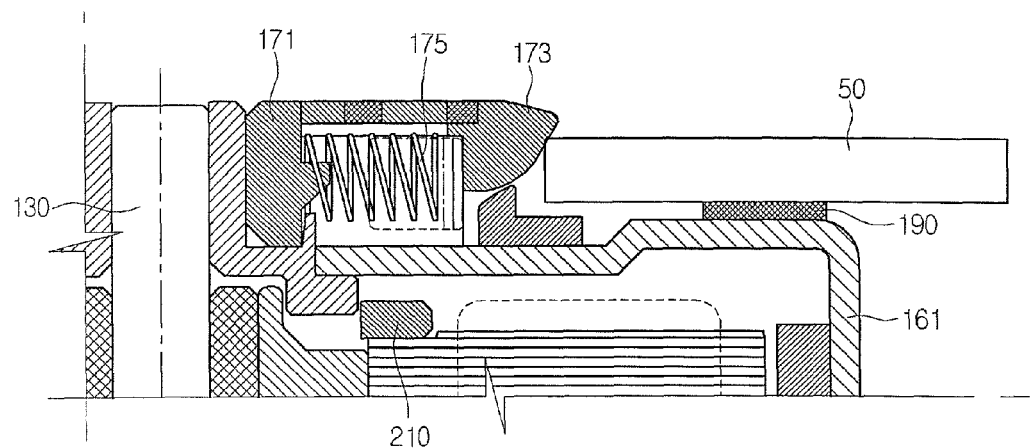

FIGS. 2 and 3 are views illustrating a clamping device according to an embodiment of the present invention.

FIG. 2 is a plan view of a clamping device 170, and FIG. 3 is a partial enlarged view illustrating a spindle motor coupled with a clamping device 170.

It should be noted that descriptions similar to those pertaining to certain elements of the motor shown in FIG. 1 are omitted in the description of FIGS. 2 and 3.

Referring to FIGS. 2 and 3, a clamping device 170 according to one embodiment includes a body 171, three stoppers 173, three claws 177, and three elastic members 175.

The body 171 can have a disk shape. A center portion of the body 171 may be fixed to the bush 140 of FIG. 1. An inner circumference of the disk 50 can be fitted on an outer circumference of the body 171.

The stoppers 173 can be coupled to the body 171 each at the same distance from the center of the body 171. In one embodiment, the stoppers 173 are spaced at 120 degrees from one another.

The elastic members 175 disposed in an inner portion of the body 171 elastically support the stoppers 173 toward an outer portion of the body 171. In the embodiment illustrated in FIGS. 2 and 3, the elastic members are springs.

The claws 177 can be used to align the center of the disk 50 with that of the rotation shaft 130. The claws 177 can each be coupled to the body 171 at the same distance from the center of the body 171. In one embodiment, the claws 173 are spaced at 120 degrees from one another.

The stoppers 173 can include a material having a specific gravity higher than that of the body 171.

For example, the body 171 can be formed of plastic having a specific gravity ranging from about 0.5 to about 0.9. The stopper 173 can include, for example, tungsten having a specific gravity of 19.26 or copper having a specific gravity of 8.96. In addition, the stopper 173 may include materials such as ceramic, silver, aluminum, cobalt, cerium, chrome, gallium, germanium, nickel, and titanium.

That is, a powder having a specific gravity higher than that of the body 171 may be added to the stopper 173 having the same material as that of the body 171 using an injection molding. Alternatively, a material having a specific gravity higher than that of the body 171 can be formed on the body 171 using a coating process.

In addition, in an embodiment, the stopper 173 may be formed of a material having a specific gravity higher than that of the body 171.

For example, when the body 171 is formed of the plastic having a specific gravity ranging from about 0.5 to about 0.9, the stopper 173 may be formed of metal or non metal having a specific gravity higher than that of the plastic.

In addition, according to an embodiment, the stoppers 173, the body 171, and the claws 177 may include a material having a specific gravity ranging from 1 to 30.

When the stoppers 173 include a material having a specific gravity greater than 1, the stoppers 173 may support the disk 50 more firmly than the stoppers 173 formed of plastic having a specific gravity ranging from about 0.5 to about 0.9.

In certain embodiments, the center of gravity of the stopper 173 may be higher than that of the disk 50 mounted on the rotor yoke 161, and thus the stopper 173 may push down the disk such that the disk 50 is supported more firmly.

As described above, the clamping device of the spindle motor according to embodiments of the present invention includes weights added to the stoppers contacting the inner circumference of the disk for inhibiting the release of the disk. The weights increase the centrifugal force exerted on the stoppers when the spindle motor rotates. Thus, the stopper firmly supports the disk, thereby inhibiting the release of the disk from the clamping device due to external impact.

Furthermore, the clamping device of the spindle motor according to embodiments can firmly support the disk by forming the stoppers with a material having a high specific gravity.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A clamping device of a spindle motor comprising:
   a body;
   a plurality of stoppers coupled to the body, wherein each stopper includes a material having a specific gravity higher than that of the body; and
   a plurality of elastic members, each elastic member elastically supporting a stopper of the plurality of stoppers,
   wherein at least a portion of each stopper is coated with the material having a specific gravity higher than the specific gravity of the body.

2. The clamping device according to claim 1, wherein the center of gravity of a stopper of the plurality of stoppers is located higher than the center of gravity of a disk.

3. The clamping device according to claim 1, wherein the material included in each stopper has a specific gravity in the range of 1 to 30.

4. The clamping device according to claim 1, wherein each of the plurality of elastic members is a spring.

* * * * *